US012664552B2

(12) United States Patent
Javed et al.

(10) Patent No.:  US 12,664,552 B2
(45) Date of Patent:      Jun. 23, 2026

(54) SYSTEMS AND METHODS FOR SECURE TRANSFERS

(71) Applicant: JPMORGAN CHASE BANK, N.A., New York, NY (US)

(72) Inventors: Abdullah Javed, London (GB); Galyna Ogol, London (GB); Desislav Petrov Petrov, London (GB); Radu-Mihai Pana-Talpeanu, London (GB); Matej Sip, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 92 days.

(21) Appl. No.: 18/653,883

(22) Filed: May 2, 2024

(65) Prior Publication Data

US 2024/0370874 A1    Nov. 7, 2024

Related U.S. Application Data

(60) Provisional application No. 63/500,473, filed on May 5, 2023.

(51) Int. Cl.
G06Q 20/40          (2012.01)
(52) U.S. Cl.
CPC ............................... G06Q 20/4016 (2013.01)
(58) Field of Classification Search
None
See application file for complete search history.

(56) References Cited

U.S. PATENT DOCUMENTS

2002/0111916 A1* 8/2002 Coronna .............. G06Q 20/382
705/40
2011/0213707 A1* 9/2011 Jackson ................. G06Q 20/40
707/769
(Continued)

FOREIGN PATENT DOCUMENTS

CN          113962682         1/2022

OTHER PUBLICATIONS

International Search Report and Written Opinion of the International Searching Authority, dated Jul. 9, 2024, from corresponding International Application No. PCT/US2024/027718.

*Primary Examiner* — Gregory S Cunningham, II
(74) *Attorney, Agent, or Firm* — GREENBERG TRAURIG LLP

(57) ABSTRACT

In some aspects, the techniques described herein relate to a method for a secure transaction comprising: receiving a transaction request comprising payment information, at a payments platform executed by a server and from a sender interface executed on a sender's device; generating, at the payments platform, a link with a unique payment identification token specific to the transaction request; sending the link with the unique payment identification token to a receiver; receiving an API call when the link is activated by the receiver using a receiver interface executed on a receiver's device; in response to the payments platform determining the link is activated, sending available payment details to the receiver and a request for a receiver detail; receiving the receiver detail; conducting a assessment based on the payment information and the receiver detail; and based on the assessment exceeding a threshold, executing a payment according to the transaction request.

12 Claims, 5 Drawing Sheets

(56) References Cited

U.S. PATENT DOCUMENTS

| | | | |
|---|---|---|---|
| 2014/0278609 A1* | 9/2014 | Capps | G06Q 20/208 |
| | | | 705/5 |
| 2015/0046327 A1 | 2/2015 | Taupitz | |
| 2020/0349573 A1* | 11/2020 | Dong | G06N 5/022 |
| 2021/0049669 A1 | 2/2021 | Erez et al. | |
| 2021/0374757 A1* | 12/2021 | Bhusri | G06F 21/313 |
| 2022/0374846 A1* | 11/2022 | Burnam | G06Q 20/229 |
| 2023/0196447 A1* | 6/2023 | Pronski | G06Q 30/0637 |
| | | | 705/26.82 |
| 2024/0354751 A1* | 10/2024 | Tan | G06Q 20/223 |

* cited by examiner

300

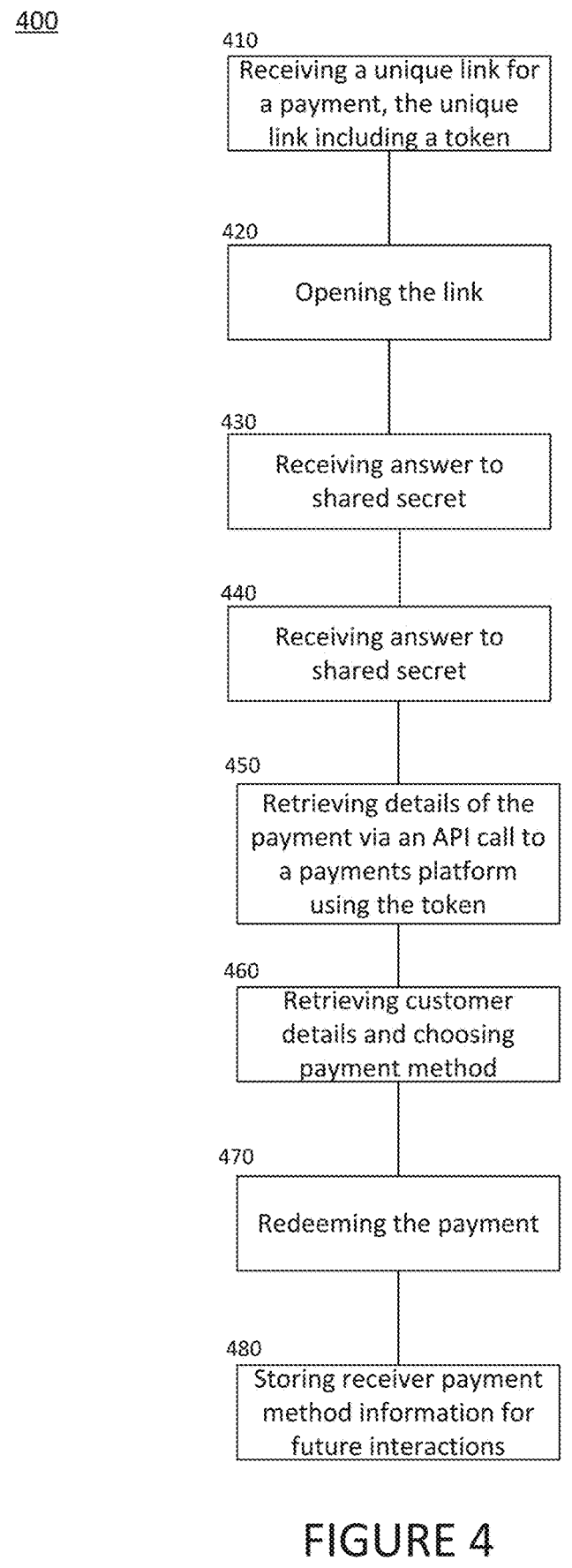

400

410
Receiving a unique link for a payment, the unique link including a token

420
Opening the link

430
Receiving answer to shared secret

440
Receiving answer to shared secret

450
Retrieving details of the payment via an API call to a payments platform using the token 460
Retrieving customer details and choosing payment method 470
Redeeming the payment 480
Storing receiver payment method information for future interactions

FIGURE 4

SYSTEMS AND METHODS FOR SECURE TRANSFERS

RELATED APPLICATIONS

This application claims priority to, and the benefit of, U.S. Provisional Patent Application Ser. No. 63/500,473, filed May 5, 2023, the disclosure of which is hereby incorporated, by reference, in its entirety.

BACKGROUND

1. Field of the Invention

Aspects generally relate to systems and methods for secure transfers.

2. Description of the Related Art

Much of the fraud activity that involves banking, transactions, money transfers, and other financial services is today targeted at out-of-band communications that are in some way involved in a financial services process. Such out-of-band communications include email messages, Short Messaging Service (SMS) messages (i.e., text messages), and other unsecured communication channels. Accordingly, systems and methods that place financial process wholly in-band with respect to a providing organization's secured technology infrastructure and secured channels and processes are crucial to secure financial services provided electronically. Of particular importance with respect to fraud prevention in, e.g., fund transfers, is relegating all sensitive institutional details, such as account numbers, to secured channels.

SUMMARY

In some aspects, the techniques described herein relate to a method including: receiving a notification via an interface, wherein the notification includes a link with a unique payment identification token; opening the link through a channel; retrieving payment information using an API and the unique payment identification token; retrieving available payment details for an alias; adding receiver payment details to the payment using the API and the unique payment identification token; receiving a notification that a payment process has completed.

In some aspects, the techniques described herein relate to a method comprising receiving a notification via an interface, wherein the notification includes a link with a unique payment identification token; opening the link through a channel; retrieving payment information using an API and the unique payment identification token; retrieving available payment details for an alias; adding receiver payment details to the payment using the API and the unique payment identification token; executing the payment; and receiving a notification that a payment process has completed. In some aspects, the detail of the payment may comprise one or more of: a sender, an amount, a currency, and a destination. In some aspects, an interface of a customer user device may be configured to receive confirmation of the payment detail or an additional payment detail. In some aspects, the method may further comprise comparing a payment method among available options and choosing the least expensive payment method. In some aspects, the method may further comprise calculating a screening risk score using information of one or more of a payment route, a sender, and a recipient. In some aspects, the information may be an identity of the sender and/or recipient, and/or a previous activity of the sender and/or recipient. In some aspects, additional information collected from sender and/or receiver may be retrieved by way of communicating directly to one or both in the process of payment initiation or execution. In some aspects, the method may further comprise, if the screening risk score is below a threshold, retrieving one or more of: an identity document or additional identifying information.

In some aspects, the techniques described herein relate to a method comprising receiving a notification, via an interface of a mobile application executed by a user device, comprising a link with a unique payment identifier token that allows a payment to be claimed within a pre-defined expiry window; opening the link through a channel; retrieving, via an API call to a payments platform using the unique token, a detail of the payment; and executing the payment. In some aspects, the detail of the payment comprises one or more of: a sender, an amount, and a destination. an interface of the mobile application is configured to receive confirmation of the payment detail or an additional payment detail. In some aspects, the method may further comprise comparing a payment method among available options and choosing the least expensive payment method. In some aspects, the method may further comprise calculating a screening risk score using information of one or more of a payment route and a recipient. In some aspects, the method may further comprise, if the screening risk score is below a threshold, retrieving one or more of: an identity document or additional identifying information.

In some aspects, the techniques described herein relate to a method comprising receiving payment details, from an interface of a mobile application executed by a user device and to a payments platform executed by a backend; generating a link including a unique payment identifier token that allows a payment to be claimed within a pre-defined expiry window; sending the link to a receiver specified in the payment details; on receipt of an API call to a payments platform using the unique token one detail of the payment, sending the payment detail to the receiver; and executing the payment. In some aspects, the payment details comprises one or more of: a sender, an amount, and a destination. In some aspects, the mobile application may be configured to receive confirmation of the payment detail or an additional payment detail. In some aspects, the method may further comprise comparing a payment method among available options and choosing the least expensive payment method. In some aspects, the method may further comprise calculating a screening risk score using information of one or more of a payment route and a recipient. In some aspects, the method may further comprise, if the screening risk score is below a threshold, retrieving one or more of: an identity document or additional identifying information. In some aspects, the method may further comprise retrieving information of an alias related to a recipient and verifying the payment based on the retrieved information. In some aspects, the method may further comprise calculating a screening risk score if a sender of the payment details is not known.

In some aspects, the techniques described herein relate to method for a secure transaction comprising receiving a transaction request comprising payment information, at a payments platform executed by a server and from a sender interface executed on a sender's device; generating, at the payments platform, a link with a unique payment identification token specific to the transaction request; sending the link with the unique payment identification token to a receiver; receiving an API call when the link is activated by the receiver using a receiver interface executed on a receiver's device; in response to the payments platform determining the link is activated, sending available payment details to the receiver and a request for a receiver detail; receiving the receiver detail; determining a transaction risk assessment score based on the payment information and the receiver detail; and based on the transaction risk assessment score exceeding a threshold, executing a payment according to the transaction request.

According to some aspects, the method may include determining whether the receiver is in an alias directory and determining to generate the link based on the receiver not being in the alias directory. According to some aspects, the method may include wherein the payments platform records a payment route associated with the payment to a database and an associated risk transaction score of the payment route. According to some aspects, the method may include comparing a payment method among available options and choosing a least expensive payment method for the transaction. According to some aspects, the method may include comprising wherein determining the risk determination score comprises using information of one or more of a sender and a previous transaction pattern. According to some aspects, the method may include comprising, if the risk determination score is below the threshold, retrieving one or more of: an identity document, a customer and risk system report of the sender or the receiver, and additional identifying information; and re-calculating the risk determination score after the retrieval.

BRIEF DESCRIPTION OF THE DRAWINGS

FIG. 4 is a receiver flow diagram for a new customer of a providing organization, in accordance with aspects.

DETAILED DESCRIPTION

Figure 1:
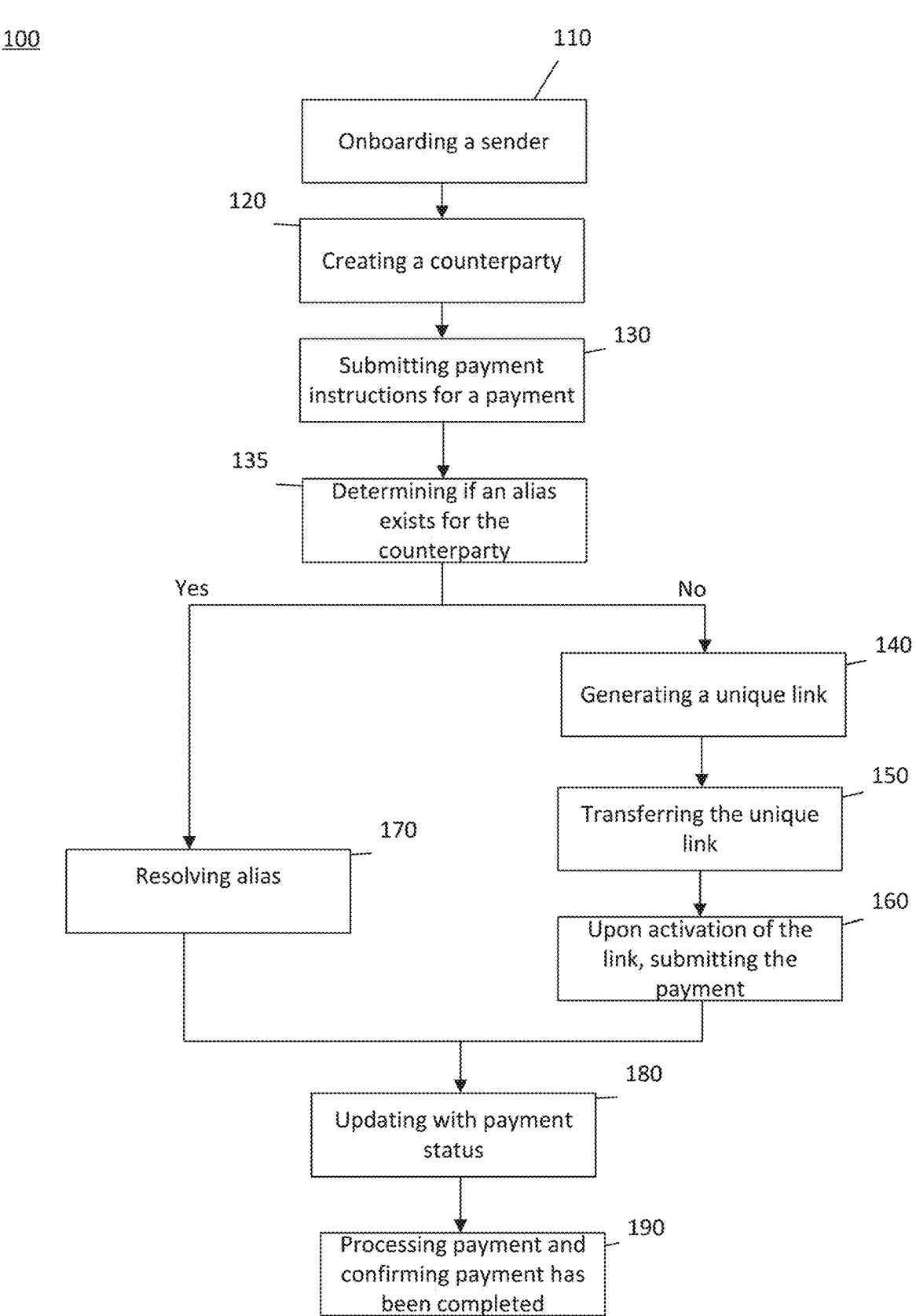
FIG. 1 is a sender flow diagram, in accordance with aspects.

Aspects generally relate to systems and methods for secure transfers.

In accordance with aspects, techniques described herein allow senders to instruct payments by sending payment invites to a receiver's alias for unknown receivers (e.g., a mobile number, email address or any other identifier that could be uniquely linked to a customer), instead of filling out receiver's account details which involves opening multiple screens. In other aspects, the receiver may be identified by alias for known receivers. Further, the interactions improve security by providing specific interfaces for the users and reducing reliance on third party sites where additional opportunities for malicious actors or mistakes are prevalent. Techniques allow the receiver to provide their preferred payment details (e.g., a bank account, card details etc.) in response to the invite to complete the payment and receive funds to an account.

Additionally, both sender and receiver will be able to track the payment at any time to see what stage it is at. Once a receiver has provided their payment details, they will also be able to save the mapping of these details to their alias and allow payments to be sent to these details by default. For instance, if a sender has mapped an account in, e.g., Germany to a receiver's email address as the receiver's alias, and a payment invite is sent to this email address, the payment will always be routed to the German account. Aspects facilitate payment to an alias, which is an easier way of sending transfers, while still maintaining all sensitive institutional details wholly within secured channels.

In accordance with aspects, senders benefit from not having to go through a manual process of obtaining receiver's payment details which takes time, might involve dealing with payment conventions of the recipient country (such as local bank identifiers, documents/payment purpose, etc.). This may lead to confusion and risk of payment misdirected (e.g., due to mistyping of payment details) as well as expose them to email payment fraud, should a fraud actor intercept or spoof emails to supply senders with scam account details. Additionally, receivers benefit from being able to keep their payment details private and have flexibility to choose their preferred payment details for receiving funds. Both senders and receivers benefit from shared digital experience of initiating and tracking payment progress. Consistent with disclosed aspects, risk may be calculated based on information of one or both of a sender and receiver and as a result of network monitoring. Consistent with disclosed aspects, additional data points may be retrieved from one or more of a sender and a receiver regarding the risk calculation.

In accordance with aspects, as used herein, the following terms have the corresponding meanings:

Sender: an individual or business entity that sends funds to an alias using the techniques described herein. A sender may be a customer of a providing organization and may have a payment account product, holding an account that allows sending of payments. The providing organization may be a financial institution.

Sender interface: a sender's interface used to access the systems, processes and techniques described herein (e.g., a mobile application, web interface, etc.).

Customer & Risk System: This component may be applicable when a business client that has an established customer base whose details are owned by the business client and maintained within the "Client's Customer & Risk System". In some embodiments, the Payments Platform has a partial view of the customers' information and therefore a data exchange through the Client's Customer & Risk System may improve the accuracy of the fraud detection.

In some embodiments, this component is not present when customers have an exclusive relationship with the providing organization. In such cases, the Payments Platform has immediate access to necessary customer data, eliminating the benefit for data exchange through the Client Customer & Risk Systems.

Payments Platform: a backend technology infrastructure of a providing organization including compute processing hardware and software required for executing the techniques described herein.

Receiver: an individual or business entity that has been sent funds by a sender.

Receiver interface: a receiver's interface used to access the systems, processes and techniques described herein. An exemplary receiver interface may be, e.g., a mobile app (which the receiver may have to download and/or install on a mobile device, since they may have not yet been onboarded. Other receiver interfaces may be a web interface or the like.

Alias Directory: a source of alias data, mainly responsible for holding mappings from an alias (phone number, e-mail, other possible identifiers) to a target destination (such as a bank account, a mobile wallet, a card, or any device or system that can receive funds via an electronic transfer).

FIG. 1 is a sender flow, in accordance with aspects.

At step 110, in the situation where the sender is not an existing customer, but a prospect, they will go through an appropriate level of onboarding (where they provide e-mail, name, address, telephone number, for example) and set up an account. The account may be set up with a customer electronic device comprising a processor capable of processing instructions consistent with a browser or application able to receive customer or prospect details.

At step 120, the sender creates a new counterparty with the payments platform, with a proposed payment method, and specifies the target (i.e., proposed receiver identified by alias), and a preferred language; fraud prevention techniques can/will also be applied (such as a secret word, a PIN). The sender may provide details regarding the counterparty using a sender's interface. The counterparty may be a proposed recipient.

At step 130, sender submits payment instruction for a payment to the alias (e.g., an FX transfer or transaction) or counterparty. The payment sender may use a sender's interface on a sender device, such as a mobile device or personal computer, for the payment information and/or a fraud prevention challenge.

At step 135, the payments platform determines if an alias exists for the counterparty. According to some aspects, the payments platform may compare the payment instruction detail identifying the counterparty or information associated with the counterparty (e.g., phone number, name, address) to an alias directory.

At step 140, if the payments platform cannot find the alias in the alias directory, the payments platform receives and saves the payment instruction and uses it to generate payment information if needed and compute a unique link, which encodes the payment information. The unique link is associated with and is only used for a single transaction. The unique link may include a unique payment identification token.

At step 150, the unique link is sent via e-mail/SMS or some other method to the receiver. The unique link may be available for a specific period of time (e.g., three days).

At step 160, the unique link may be submitted to the receiver. In some embodiments, the receiver opens or activates the link within the specific period of time and is taken to the appropriate interface, depending on where the link was opened from. When the receiver opens the link, an API call to the payments platform is generated, in order to fetch the payment details. The payments platform is thus informed as soon as the link is accessed because of the API call. The response to this API call will be the payment information. The API call may occur through a protocol such as HTTPS. The receiver may use a server, backend, or computer to process instructions associated with the interface to receive the payment. In some embodiments, a new account may opened with a provider organization or account details with another provider organization may be retrieved. In some embodiments, the receiver may receive the payment if a fraud prevention score is high enough. In some embodiments, the payments platform may retrieve or receive the receiver details and/or confirmation of the receipt. The unique link may be a random alpha-numeric string. According to some aspects, the payment is redeemed by making an API call using the unique payment identifier to add the details provided by the receiver At step 170, if the payments platform has a record of the alias, then the payments platform may verify whether the determined alias is the desired receiver. According to some aspects, the payments platform may retrieve details associated with the desired receiver from an alias directory after verification that the desired receiver has been found. According to some aspects, the payments platform may be configured to send a notification to the proposed recipient of the desired payment as a verification check. According to some aspects, the payments platform may be configured to request verification from a sender of the retrieved details of the desired receiver as a verification check.

At step 180, the payments platform keeps both sender and receiver apprised of any updates to the payment status. For example, the payments platform may automatically send updates regarding when each preceding step discussed herein is completed. The payments platform may save the payment instruction and use the payment payload to compute a unique link, which encodes the payment information.

At step 190, when the payment reaches its final state and a payment transaction has transferred value from a sender account to a receiver account, the payments platform may send a final notification to both parties.

Figure 2:
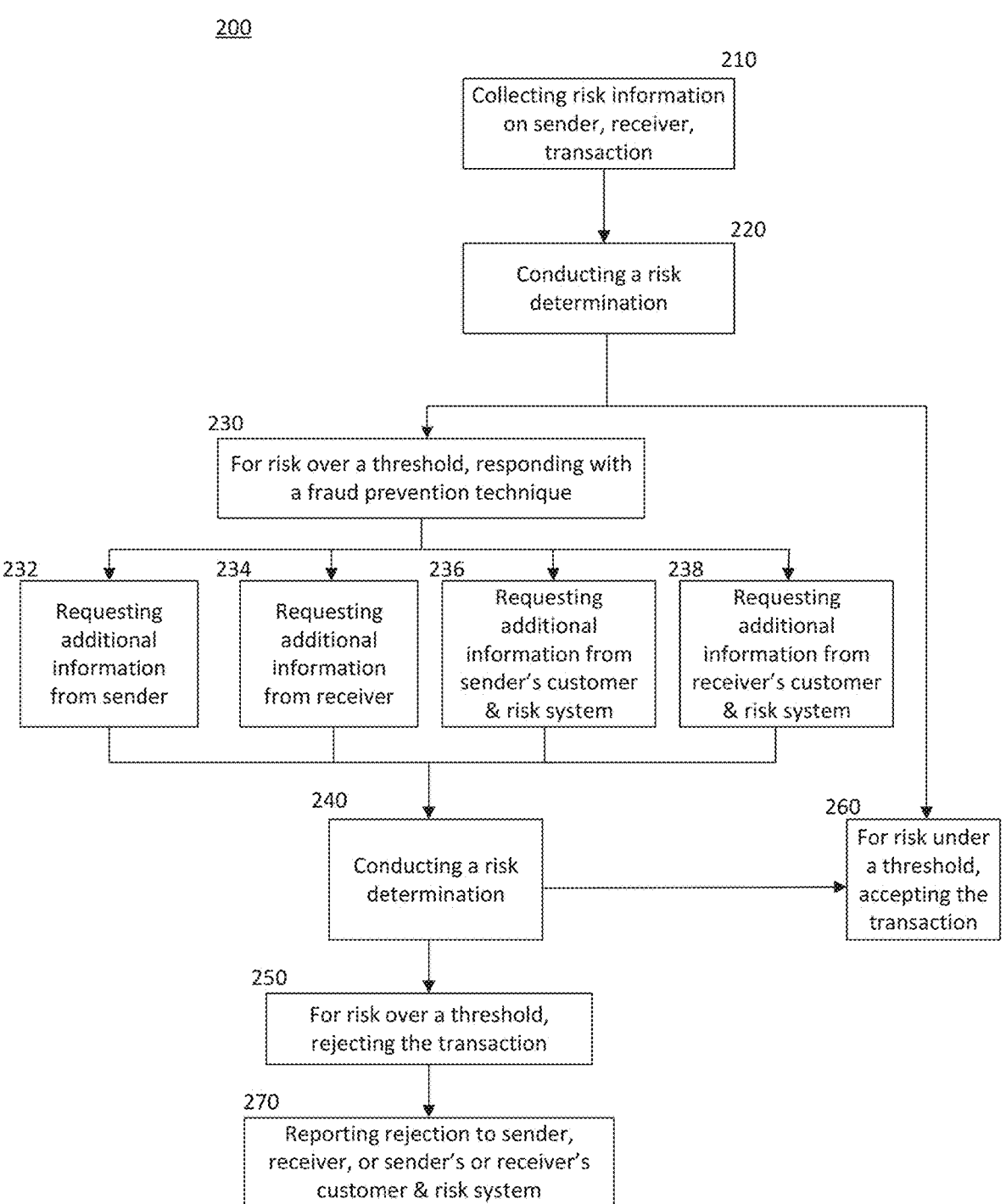
FIG. 2 is a fraud prevention flow diagram, in accordance with aspects.

FIG. 2 is a fraud detection flow of a sender flow, in accordance with aspects.

According to some aspects, a fraud detection flow may be conducted as discussed above between steps of FIG. 1 for a sender or a receiver. There is risk for a payments platform to perform a transaction without knowledge of the sender and/or the receiver, and the present fraud detection flow ameliorates or eliminates such risk by requesting information from involved parties including the sender, receiver, sender and/or receiver financial institutions, and/or a database of past transactions. The fraud detection flow can occur anytime after a payment transaction is submitted. However, it is convenient and reduces error and workload to ask the recipient for recipient details that may be used for a payment transaction after a link is activated consistent with step 160 of FIG. 1 or confirmation of a recipient alias is provided consistent with step 170 of FIG. 1.

With reference to FIG. 2, at step 210, risk information on a sender, a receiver, or of a transaction may be collected by a payments platform. The information may reside in a database of the payments platform, it may be from a sender or a receiver, and/or it may be from knowledge of the payment transaction request or previous transaction pattern on the payments platform. For example, the information may include a location origination of the sender and/or receiver, the information may include a time of day that the payment transaction request is submitted, the information may include whether a sender and/or a receiver has a relationship with a financial institution, the payments platform, or a credit score and whether the transaction follows a typical pattern for the sender and/or receiver.

At step 220, a risk determination score may be calculated by the payments platform based on available information.

At step 230, if the risk of the transaction is deemed to be over a certain limit, an appropriate fraud/anti-money laundering prevention strategy will be deployed based on the severity of the risk. Strategies can include one or more of steps 232 or 234 of requesting more information from the sender and/or the receiver. Strategies can include one or more of steps 236 or 238 of requesting additional information from the sender's and/or the receiver's customer and risk system. According to some aspects, strategies may include one or more of the following: sender re-confirming the nature of relationship with the receiver and their confidence in the transaction; request additional information from the receiver regarding receiver's relationship with or knowledge of the sender, sender's or receiver's identification information, and a credit history associated with the sender and/or receiver. Additional information may be a shared secret between the payments platform, the sender, and the receiver.

At step 240, a risk determination may be conducted with updated information based on one or more of the risk strategies. If answers are unsatisfactory and if the risk determination score is below a threshold, the payments platform may determine to proceed to step 250. Step 250 may include determining to reject the requested transaction including to outright cancel the transaction, return funds to the receiver, and/or block the funds.

At step 260, if the score is determined to be under a threshold (e.g., the risk is low), the payment will proceed.

At step 270, the payments platform stores and, in some embodiments, shares with one or more of sender, receiver, sender's or receiver's customer & risk system, a risk score related to the payment.

According to some aspects, the payment mapping may be saved for future transactions. In some aspects, the customer may be asked if the newly created mapping should be used for automatic payments in the future and confirms the choice. If the choice is positive, it is marked into the alias/counterparty database.

In an optional implementation of FIG. 2, screening risk scores will be calculated using additional information about the payment route and the recipient. The information could be sourced from internal data or any 3rd parties inclusive of those participating in the transaction. Internal information could include elements such as previous usage patterns observed for a recipient. Examples of external data might include data source from industry fraud prevention databases, recipient credentials or/and device information that might indicate heightened fraud/money laundry risk, 3rd parties involved in processing card transactions (e.g., payment card networks). According to some aspects, a providing organization distributes the solution via a client with an existing retail customer (e.g., customers have relationship with both the providing organization and the client). According to some aspects, providing organization distributes the solution directly to the end users (e.g., retail customers have direct and exclusive relationship with the providing organization). According to some aspects, a providing organization distributes the solution via a client with an existing retail customer (e.g., retail customers have relationship with both the providing organization and the client) as will be discussed further herein.

Steps of FIG. 2 may be taken if the risk model indicates a heightened level of potential fraud, the platform could request any additional metadata from the receiver that it considers necessary. These could include re-validating expired or current identity documents, providing additional personal information or anything else that will help manage the risk.

According to some aspects, downstream payment providers or corresponding banks will be sending multiple status updates for the payment, similar to step 170 of FIG. 1. For example, a material update may lead to payment status update that will be reflected in the tracking journey both for the sender and the receiver. Similar to step 180 of FIG. 1, once the payment is confirmed as successful, both the sender and the receiver may be provided information reflected in the payment journey and notifications via different Interfaces will be sent to confirm the successful payment.

Figure 3:
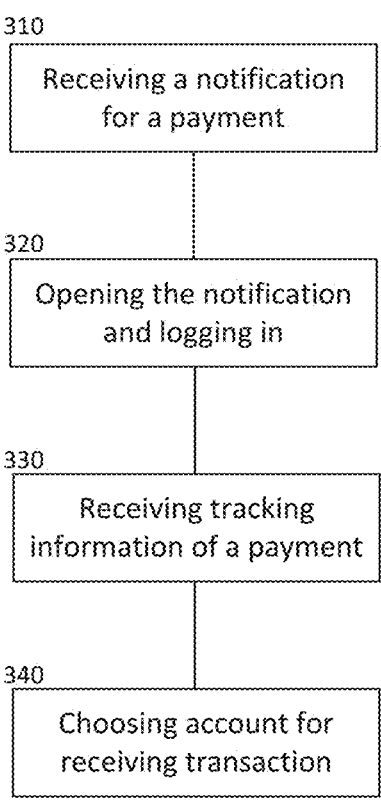
FIG. 3 is a receiver flow diagram for an existing customer of a providing organization, in accordance with aspects.

FIG. 3 is a receiver flow for an existing customer of a providing organization, in accordance with aspects.

At step 310, a known receiver, consistent with disclosed aspects, receives a notification via an interface (SMS, email, push notifications, etc.) containing a link with a unique payment identifier token that allows the payment to be claimed within a pre-defined expiry window.

At step 320, a notification of a potential payment is received and the receiver may open the link to an appropriate interface (in some cases, e.g., a mobile application, this may involve downloading or otherwise retrieving the mobile app first). In some cases, the receiver will receive payment details via an API call to the payments platform.

At step 330, the receiver may receive tracking information of the payment. If the receiver has configured their alias to automatically use the bank details, they will see the tracking information. The tracking information may be received via an interface, e.g., the mobile application.

At step 340, the receiver may enter information for the potential payment. For example, one or more available payment details stored against the alias may be retrieved, and the process may prompt the customer to make a choice between existing details or adding details. According to some aspects, the customer may choose one of the existing details or adds new details. According to some aspects, a least expensive payment method, a type of payment method (Swift, etc.), and/or a quickest payment method may be used.

According to some aspects, in case a payment to a chosen account detail involves a more expensive way of paying vs originally instructed (e.g., wire instead of ACH), any delta in fees is calculated and a final payment summary background is shown to the receiver. According to some aspects, the receiver may confirm final detail selection.

FIG. 4 is a receiver flow for a new customer of a providing organization, in accordance with aspects.

At step 410, a prospect receives a notification via an interface (SMS, email, push notification, etc.) containing a link with a unique payment identifier token that allows the payment to be claimed within a configurable expiry window.

At step 420, the link is opened through an appropriate receiver interface (in some cases, say for a mobile app interface, this might involve going to an app store and downloading the mobile app first).

At step 430, the receiver accepts a challenge to prove they are the intended receiver (e.g., via a shared secret).

At step 440, the payments platform may receive the answer to the shared secret and verify the answer against a shared secret for the sender. The shared secret may be specific to the transaction.

At step 450, the details of the payment (sender, amount, destination) are retrieved via an API call to the payments platform using the unique token from step 410. According to some aspects, available payment methods (card, wallet, cash, bank transfer) for the pre-selected destination are shown to the user (e.g., wire, ACH, ATP, etc.).

At step 460, the customer may open an account with the platform and go through an appropriate onboarding journey. As a part of that a new alias entry is created pointing to the newly created account. In some aspects, should the customer not want to open an account, they may be directed to a minimal onboarding journey requesting a reduced amount of information like name & email. They also provide third party bank details. As a part of that a new alias entry is created pointing to the newly created account.

At step 470, the payment platform completes the payment instruction with the payment details provided by the new customer in the previous step and processes the payment (using payment processing capabilities).

At step 480, the payments platform may save the payment mapping for future transactions. In some aspects, the payments platform may ask if the newly created mapping should be used for automatic payments in the future and confirms the choice. If the choice is positive, it is marked into the alias/counterparty database.

Figure 5:
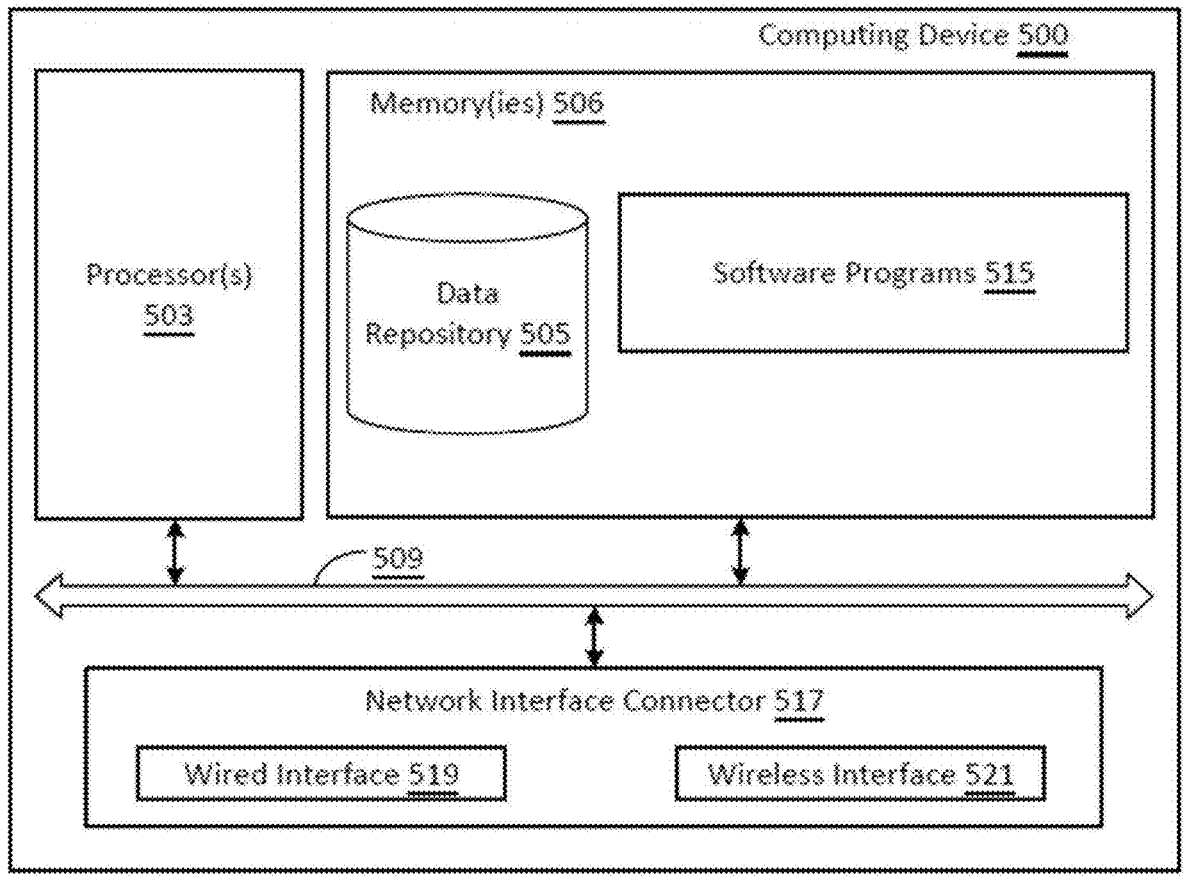
FIG. 5 is a block diagram of a computing device for implementing certain aspects of the present disclosure.

FIG. 5 is a block diagram of a computing device for implementing certain aspects of the present disclosure. FIG. 5 depicts exemplary computing device 500. Computing device 500 may represent hardware that executes the logic that drives the various system components described herein. For example, system components such as an interface, various database engines and database servers, and other computer applications and logic may include, and/or execute on, components and configurations like, or similar to, computing device 500.

Computing device 500 includes a processor 503 coupled to a memory 506. Memory 506 may include volatile memory and/or persistent memory. The processor 503 executes computer-executable program code stored in memory 506, such as software programs 515. Software programs 515 may include one or more of the logical steps disclosed herein as a programmatic instruction, which can be executed by processor 503. Memory 506 may also include data repository 505, which may be nonvolatile memory for data persistence. The processor 503 and the memory 506 may be coupled by a bus 509. In some examples, the bus 509 may also be coupled to one or more network interface connectors 517, such as wired network interface 519, and/or wireless network interface 521. Computing device 500 may also have user interface components, such as a screen for displaying graphical user interfaces and receiving input from the user, a mouse, a keyboard and/or other input/output components (not shown).

The various processing steps, logical steps, and/or data flows depicted in the figures and described in greater detail herein may be accomplished using some or all of the system components also described herein. In some implementations, the described logical steps may be performed in different sequences and various steps may be omitted. Additional steps may be performed along with some, or all of the steps shown in the depicted logical flow diagrams. Some steps may be performed simultaneously. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

Consistent with disclosed aspects, distribution may be accomplished by providing an organization that distributes the solution directly to the end users (i.e., retail customers have direct and exclusive relationship with the provider) or providing organization distributes the solution via a client with an existing retail customer (i.e., retail customers have relationship with both the providing organization and the client).

The system of the invention or portions of the system of the invention may be in the form of a "processing machine" a "computing device," an "electronic device," a "mobile device," etc. These may be a computer, a computer server, a host machine, etc. As used herein, the term "processing machine," "computing device, "electronic device," or the like is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular step, steps, task, or tasks, such as those steps/tasks described above. Such a set of instructions for performing a particular task may be characterized herein as an application, computer application, program, software program, or simply software. In one aspect, the processing machine may be or include a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example. The processing machine used to implement the invention may utilize a suitable operating system, and instructions may come directly or indirectly from the operating system.

The processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion.

Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some aspects of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

What is claimed is:

1. A method for a secure transaction comprising:

receiving a transaction request comprising payment information and an identification of a shared secret, at a payments platform executed by a server and from a sender interface executed on a sender's device;

determining to generate a link based on the receiver not being in an alias directory;

generating, at the payments platform, a link with a unique payment identification token specific to the transaction request only once the receiver has answered a shared secret request with the shared secret, the unique payment identification token being associated with a single transaction and valid only within a pre-defined expiry window;

sending the link with the unique payment identification token to a receiver;

receiving an API call when the link is activated by the receiver using a receiver interface executed on a receiver's device, wherein the API call occurs via HTTPS;

in response to the payments platform determining the link is activated, sending available payment details to the receiver and a request for a receiver detail via the API call and relegating sensitive institutional details, including account numbers, to secured channels of the payments platform;

receiving the receiver detail;

determining a transaction risk assessment score based on the payment information and the receiver detail;

recording, to a database, a payment route associated with the payment and a risk transaction score of the payment route;

based on the transaction risk assessment score exceeding a threshold, executing a payment according to the transaction request; and sending the risk transaction score of a payment route of the transaction request to a customer and storing the risk transaction score in the risk system database of a financial institution.

2. The method of claim 1, further comprising comparing a payment method among available options and choosing a least expensive payment method for the transaction.

3. The method of claim 1, further comprising wherein determining the risk transaction score comprises using information of one or more of a sender and a previous transaction pattern.

4. The method of claim 3, further comprising, if the risk transaction score is below the threshold, retrieving one or more of: an identity document, a customer and risk system report of the sender or the receiver, and additional identifying information; and re-calculating the risk transaction score after the retrieval.

5. A system for conducting a secure transaction comprising at least one computing device including a processor, the processor configured to execute instructions to:

receive a transaction request comprising payment information and an identification of a shared secret from a sender interface executed on a sender's device;

determine to generate a link based on the receiver not being in an alias directory;

generate a link with a unique payment identification token specific to the transaction request only once the receiver has answered a shared secret request with the shared secret, the unique payment identification token being associated with a single transaction and valid only within a pre-defined expiry window;

send the link with the unique payment identification token to a receiver;

receive an API call when the link is activated by the receiver using a receiver interface executed on a receiver's device, wherein the API call occurs via HTTPS;

in response to the payments platform determining the link is activated, send available payment details to the receiver and a request for a receiver detail via the API call and relegating sensitive institutional details, including account numbers, to secured channels of the payments platform;

receive the receiver detail;

determine a transaction risk assessment score based on the payment information and the receiver detail;

record, to a database, a payment route associated with the payment and a risk transaction score of the payment route;

based on the transaction risk assessment score exceeding a threshold, execute a payment according to the transaction request; and send the risk transaction score of a payment route of the transaction request to a customer and storing the risk transaction score in the risk system database of a financial institution.

6. The system of claim 5, the instructions further comprising to compare a payment method among available options and choosing the least expensive payment method.

7. The method of claim 5, the instructions further comprising wherein to determine the risk transaction score comprises using information of one or more of a sender and a previous transaction pattern.

8. The method of claim 7, the instructions further comprising to, if the risk transaction score is below the threshold, retrieving one or more of: an identity document, a customer and risk system report of the sender or the receiver, and additional identifying information; and re-calculating the risk transaction score after the retrieval.

9. A non-transitory computer readable storage medium, including instructions stored thereon for a secure transaction, which when read and executed by one or more computers cause the one or more computers to perform steps comprising:

receiving a transaction request comprising payment information and an identification of a shared secret, at a payments platform executed by a server and from a sender interface executed on a sender's device;

determining to generate a link based on the receiver not being in an alias directory;

generating, at the payments platform, a link with a unique payment identification token specific to the transaction request only once the receiver has answered a shared secret request with the shared secret, the unique payment identification token being associated with a single transaction and valid only within a pre-defined expiry window;

sending the link with the unique payment identification token to a receiver;

receiving an API call when the link is activated by the receiver using a receiver interface executed on a receiver's device, wherein the API call occurs via HTTPS;

in response to the payments platform determining the link is activated, sending available payment details to the receiver and a request for a receiver detail via the API call and relegating sensitive institutional details, including account numbers, to secured channels of the payments platform;

receiving the receiver detail;

determining a transaction risk assessment score based on the payment information and the receiver detail;

recording, to a database, a payment route associated with the payment and a risk transaction score of the payment route;

based on the transaction risk assessment score exceeding a threshold, executing a payment according to the transaction according to the transaction request; and sending the risk transaction score of a payment route of the transaction request to a customer and storing the risk transaction score in the risk system database of a financial institution.

10. The steps of claim 9, further comprising comparing a payment method among available options and choosing a least expensive payment method for the transaction.

11. The steps of claim 9, further comprising calculating a screening risk score using information of one or more of a sender and a previous transaction pattern.

12. The steps of claim 11, further comprising, if the risk transaction score is below the threshold, retrieving one or more of: an identity document, a customer and risk system report of the sender or the receiver, and additional identifying information; and re-calculating the risk transaction score after the retrieval.

* * * * *